United States Patent [19]
Watanabe

[11] Patent Number: 5,634,155
[45] Date of Patent: May 27, 1997

[54] PHASE DETECTION ELECTRICAL CONNECTION DEVICE

[75] Inventor: Suminori Watanabe, Saitama-ken, Japan

[73] Assignee: Nikon Corporation, Tokyo, Japan

[21] Appl. No.: 387,073

[22] Filed: Feb. 13, 1995

[30] Foreign Application Priority Data

Apr. 21, 1994 [JP] Japan ................................. 6-105055

[51] Int. Cl.$^6$ ................................................ G03B 17/00
[52] U.S. Cl. ............................................ 396/297; 396/542
[58] Field of Search ........................... 354/289.1, 289.11, 354/289.12, 485; 396/297, 542

[56] References Cited

U.S. PATENT DOCUMENTS

| | | | |
|---|---|---|---|
| 4,682,871 | 7/1987 | Metabi ........................... | 354/485 X |
| 4,789,875 | 12/1988 | Wakabayashi et al. ............. | 354/485 X |
| 5,283,606 | 2/1994 | Konno et al. ..................... | 354/289.1 |

*Primary Examiner*—Safet Metjahic
*Assistant Examiner*—J. K. Han
*Attorney, Agent, or Firm*—Oliff & Berridge

[57] ABSTRACT

An electrical connection device includes a substrate, first and second semiconductor patterns formed on the substrate, and a contact having two contact terminals. The first semiconductor pattern has a first OFF pattern section. The second semiconductor pattern has at least two second OFF pattern sections. The two contact terminals are at different voltage levels and are disposed to touch the first semiconductor pattern and/or the second semiconductor pattern, selectively causing electricity to flow through the semiconductor patterns. No electricity flows if both the contact terminals touch either the first OFF pattern section or one of the second OFF pattern sections. The arrangement of the first OFF pattern section and the second OFF pattern sections preserves the functionality of the electrical connection device, yet reduces its size.

26 Claims, 4 Drawing Sheets

PHASE DETECTION ELECTRICAL CONNECTION DEVICE

BACKGROUND OF THE INVENTION

1. Field of the Invention

The present invention relates to an electrical connection device used as a so-called phase amount detection device and, in particular, to such devices used for film position or lens position detection in a camera.

2. Description of Related Art

A conventional electrical connection device is shown in FIGS. 5 and 6. FIG. 5 shows the detailed configuration of the semiconductor patterns positioned on the rigid substrate. FIG. 6 is a cross-sectional view through the axis of rotation A showing the relationship between the rigid substrate and the position detecting gears that have brushes that serve as contacts for contacting the semiconductor patterns.

As shown in FIG. 5, the conventional electrical connection device includes a rigid substrate 1, a first semiconductor pattern 2, and a second semiconductor pattern 3. The first semiconductor pattern 2 and the second semiconductor pattern 3 form concentric circles about an axis of rotation A on the rigid substrate 1. The first semiconductor pattern 2 is provided with an ON pattern section 2V, and the second semiconductor pattern 3 is provided with an OFF pattern section 3G. The first semiconductor pattern 2 is connected to a Vcc power source terminal at a first connection terminal 2a that extends to a terminal of the rigid substrate 1. Similarly, the second semiconductor pattern 3 is connected to a GND terminal at a second connection terminal 3a extending to a terminal of the rigid substrate.

As shown in FIG. 6, a position detecting gear 4 is disposed to rotate around the axis of rotation A. An armature brush 5 includes a contact fixed to a side surface of the position detecting gear 4. Two contact terminals 6 and 7 extend from the contact of the armature brush 5 and rub along the first and second semiconductor patterns 2 and 3 through rotation of the position detecting gear 4. A pulse signal that switches between ON and OFF states is output by tracks 6A and 7A of the contact terminals 6 and 7, respectively, coming into contact with the ON and OFF pattern sections 2V and 3G of the semiconductor patterns 2 and 3. The first and second semiconductor patterns 2 and 3 are formed on the substrate so that the tracks 6A and 7A are aligned in order to prevent chattering.

With the conventional electrical connection device having the structure described above, the contact terminal 6 touches the ON pattern section 2V of the first semiconductor pattern 2, and the contact terminal 7 touches the second semiconductor pattern 3 when the device is in the ON state (i.e., when electricity is flowing). When the device is in the OFF state (i.e., when no electricity is flowing), both of the contact terminals 6 and 7 touch the OFF pattern section 3G of the second semiconductor pattern 3.

In the conventional electrical connection device, part of the first semiconductor pattern 2 must extend outside of the tracks 6A and 7A so that an electrical connection to the first semiconductor pattern can be maintained so that no unnecessary signals are output. Accordingly, space for a frame must also be provided on the rigid substrate 1 beyond the outer periphery of the semiconductor patterns. Occasionally, a portion of the periphery of the rigid substrate must be removed because it interferes with the components surrounding the electrical connection device. Consequently, the electrical connection to the first semiconductor pattern is severed. Accordingly, providing an electrical connection device designed to operate with the same components, e.g., the position detecting gear 4, that does not interfere with any surrounding structure within the operating environment, would be advantageous.

SUMMARY OF THE INVENTION

An object of the present invention is to provide an electrical connection device that does not interfere with the surrounding components.

This and other objects are achieved by providing an electrical connection device including a substrate, first and second semiconductor patterns formed on the substrate, and a contact having two contact terminals. The substrate can be fabricated from a rigid material. The first semiconductor pattern includes a first OFF pattern section, and the second semiconductor pattern includes second OFF pattern sections. As a result, an OFF signal is produced when both contacts touch a certain area of the first semiconductor pattern, as well as when both contacts touch certain areas of the second semiconductor pattern.

The first semiconductor pattern is connected to a voltage of one level and the second semiconductor pattern is connected to a voltage of another level. The contact terminals touch and selectively cause electricity to flow through the first and second semiconductor patterns such that alternating ON and OFF signals are produced.

The first and second semiconductor patterns can be formed as concentric, generally circular shapes about an axis of rotation on the substrate. The second semiconductor pattern can be disposed on the substrate within the inner periphery of the first semiconductor pattern. The outer periphery of the first semiconductor pattern can be noncircular. The first and second semiconductor patterns can also be formed to follow a pair of parallel lines.

The second OFF pattern sections of the second semiconductor pattern are separated from each other by a predetermined spacing in the direction of rotation of the contact about the axis of rotation. The first OFF pattern section can be interposed between two of the second OFF pattern sections. The first OFF pattern can also be joined with two adjacent second OFF pattern sections. In addition, the first semiconductor pattern can also include first ON pattern sections that are regularly spaced from each other.

In the present invention, the contact terminals of the contact rub against part of the first and second semiconductor patterns on the substrate, repeatedly alternating between a first state in which electricity flows through each semiconductor pattern because each of the contact terminals touches a different semiconductor pattern, and a state in which both terminals touch either the second OFF pattern sections in the second semiconductor pattern or the first OFF pattern section in the first semiconductor pattern. As a result, alternating ON and OFF signals are produced in a regular manner.

By the electrical connection device of the present invention, the amount of free mounting space within the camera is increased, and greater flexibility in positioning the rigid substrate 1 is provided. Because of the resulting conservation of space within the camera, the overall outer dimensions of the camera body can be decreased.

BRIEF DESCRIPTION OF THE DRAWINGS

A complete understanding of the present invention may be obtained by reference to the accompanying drawings, when considered in conjunction with the subsequent detailed description thereof, in which.

DETAILED DESCRIPTION OF PREFERRED EMBODIMENTS

Figure 4:
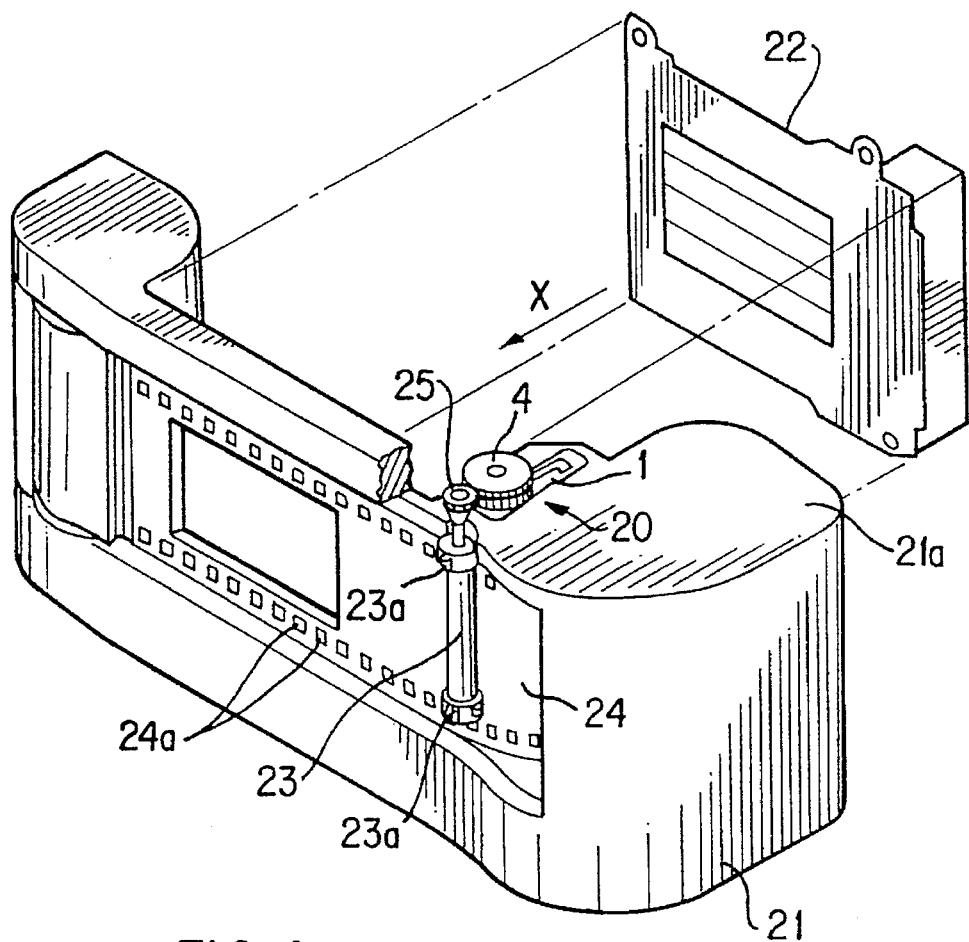
FIG. 4 is an oblique view that shows the basic structure of a camera having an electrical connection device according to the present invention that functions as a film feed position detecting device.
Figure 5:
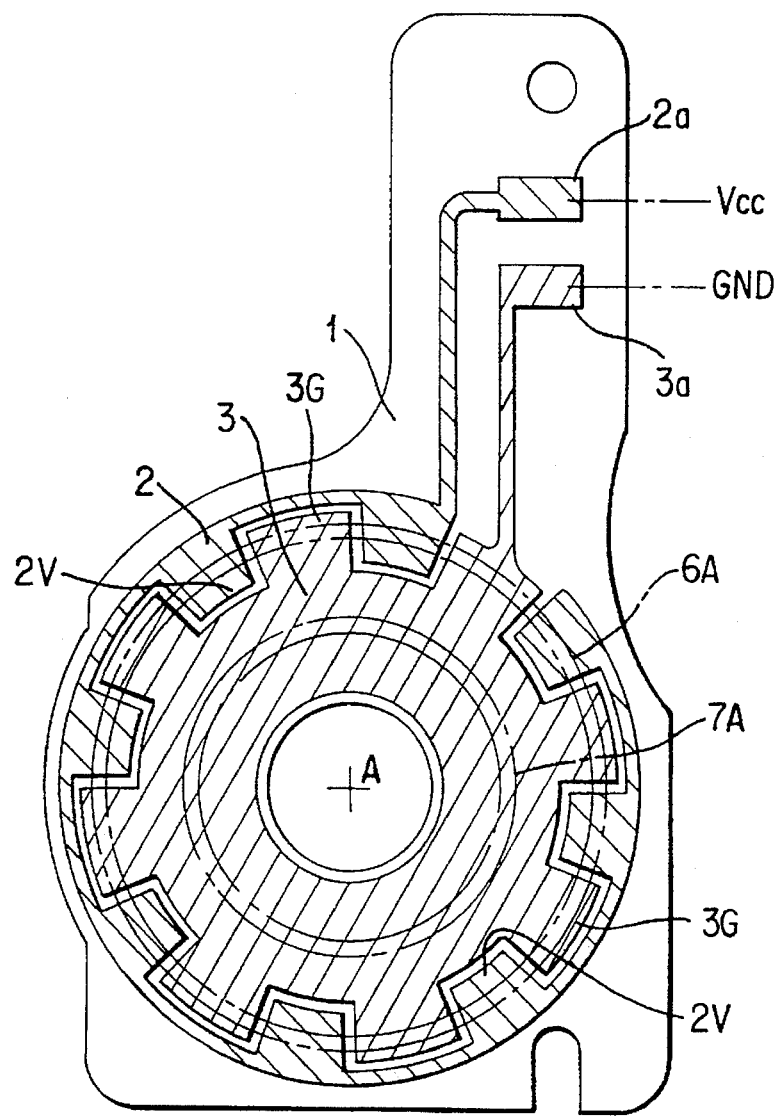
FIG. 5 is a plan view that shows the detailed shape of semiconductor patterns arranged on a rigid substrate of one type according to the prior art.
Figure 6:
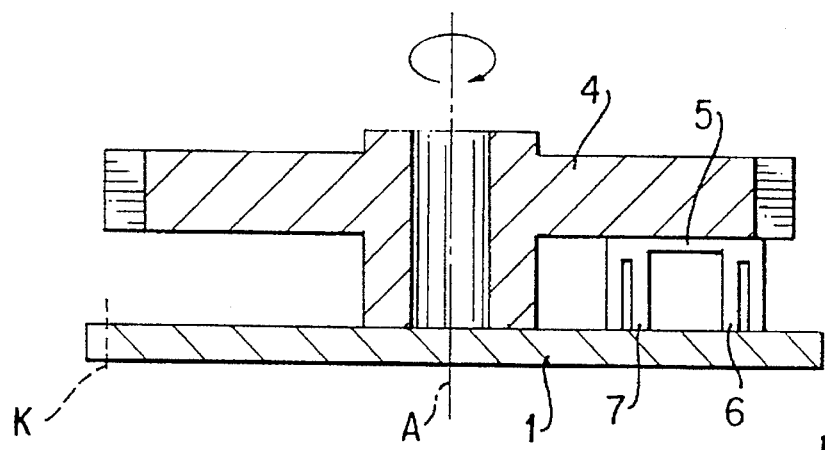
FIG. 6 is a cross-sectional view of the conventional electrical connection device that shows a position detecting gear that has a contact that rubs along the semiconductor patterns on the rigid substrate shown in FIG. 5.

FIGS. 1 through 4 show an embodiment of an electrical connection device according to the present invention, in which the elements correspondingly numbered as in FIGS. 5 and 6 have substantially the same functions as described in the preceding paragraphs.

In one embodiment, the present invention is applied to a film feed position detecting device in a camera. Referring to FIG. 4, a camera equipped with a film feed position detecting device 20 according to the present invention is shown. In this embodiment, a rigid substrate 1 is solidly affixed to a flat portion 21a provided on the top surface of the film winding side of a camera body 21. A shutter 22 is mounted in the direction indicated by the arrow and is solidly affixed to the front side of the camera body 21 between the film winding side and a cartridge side.

A sprocket 23 for feeding film has teeth 23a on its top and bottom sides that engage perforations 24a in film 24. A sprocket gear 25 connected to the top end of the sprocket 23 engages a position detecting gear 4. The film 24 is wound toward the right side in FIG. 4 by means of a commonly known film feeding mechanism (not shown). At the same time, the sprocket 23 and sprocket gear 25 rotate in the counterclockwise direction in the figure because the teeth 23a engage the perforations 24a in the film 24. The position detecting gear 4 is driven by the rotation of the sprocket gear 25 to rotate in the clockwise direction such that the film feed position can be detected by the film feed position detecting device 20.

One problem that arises during an attempt to mount the shutter 22 on the camera body 21 is that, depending on the shape of the rigid substrate 1, the shutter 22 (which is a distinct component from the rigid substrate 1) interferes with the substrate. As a result, mounting the shutter 22 becomes impossible.

This interference results because the position where the rigid substrate 1 (which includes the film feed position detecting device 20) is attached to the camera body 21 also is near where the shutter 22 is mounted, as shown in FIG. 4, due to restrictions that govern the location of the sprocket and other components. Because the shutter 22 is an assembled unit to which complex mechanisms are attached, however, eliminating the portion of it that interferes with the rigid substrate 1 is difficult. Consequently, it is preferable to eliminate part of the rigid substrate 1, but this leads to the problems described above that the present invention aims to solve.

Accordingly, the present invention provides a shape for the semiconductor patterns 2 and 3 such that a portion K of the rigid substrate 1 can be eliminated in order to prevent it from interfering with other components, e.g., the shutter 22 in the film feed position detecting device 20. In the conventional electrical connection device, as shown in FIG. 6, the eliminated part corresponds to the portion delineated by the line K.

The structure includes a rigid substrate 1 having first and second semiconductor patterns 2 and 3 that are connected to different voltages, an armature brush 5 that includes a contact having two contact terminals 6 and 7 that selectively contact and cause electricity to flow through the first and second semiconductor patterns 2 and 3, a structure that includes second OFF pattern sections 3G formed in the second semiconductor pattern 3 so that both contact terminals 6 and 7 of the brush 5 contact this pattern simultaneously, and a first OFF pattern section 2G formed in the first semiconductor pattern 2 so that both contact terminals 6 and 7 of the brush 5 contact this pattern simultaneously. In other words, the OFF pattern sections 2G and 3G are those sections of patterns 2 and 3, respectively, that will simultaneously contact both terminals 6 and 7.

The first and second semiconductor patterns 2 and 3 of the rigid substrate 1 are formed in the shape of concentric circles about an axis of rotation A. The second OFF pattern sections 3G in the second semiconductor pattern 3 are formed at a predetermined spacing in the direction of rotation. The first and second semiconductor patterns are arranged such that the first OFF pattern section 2G in the first semiconductor pattern 2 borders on part of the arrangement of second OFF pattern sections 3G in the second semiconductor pattern in the direction of rotation.

Figure 3:
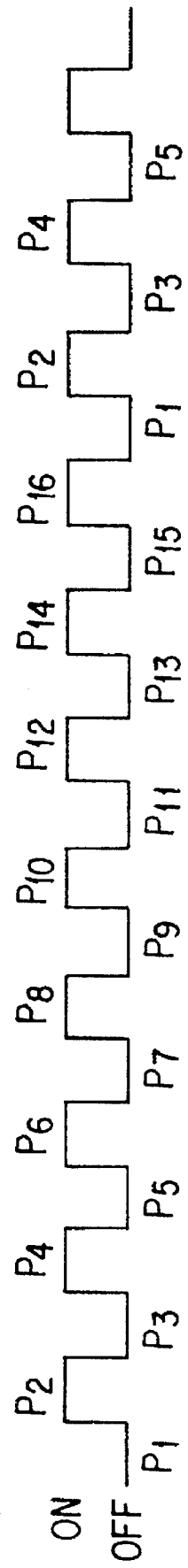
FIG. 3 is a time chart showing the signals output from the two contact terminals of the contact at each position shown in FIG. 1.

With such a structure, the two contact terminals 6 and 7 alternately and repeatedly rub against the first and second semiconductor patterns 2 and 3 on the rigid substrate 1 during the rotation of the armature brush 5. Accordingly, the position of the two contact terminals with respect to the first and second semiconductor patterns 2 and 3 determines the output state of the device. In a first state, electricity is caused to flow to both semiconductor patterns 2 and 3 because the contact terminals touch both patterns. In a second state, both contact terminals simultaneously touch a second OFF pattern section 3G in the second semiconductor pattern or simultaneously touch the first OFF pattern section 2G in the first semiconductor pattern 3, suspending the flow of electricity. The first OFF pattern section 2G of the first semiconductor pattern 2 is arranged in the same row as the second sections 3G (i.e., the first OFF pattern section 2G is aligned with the second OFF pattern sections in the direction of rotation). Therefore, ON and OFF signals are output as shown in FIG. 3 and explained below in the following paragraphs.

In other words, by altering the shape of the semiconductor patterns 2 and 3 that are used to output ON and OFF signals, the surface area required to form the semiconductor patterns can be reduced. Consequently, the shape of the rigid substrate 1 can be more freely chosen, the substrate can be made more compact, and space within the camera can be conserved.

In particular, by forming part of the second OFF pattern sections 3G used to obtain OFF signals as a first OFF pattern section 2G (which is not part of the second semiconductor pattern 3), the semiconductor patterns 2 and 3 can be shaped so that the part K of the rigid substrate 1 can be eliminated. As a result, the problem of interference between the substrate 1 and other mechanical parts (e.g., the shutter 22) can be prevented without sacrificing the functionality of the electrical connection device, as is clear from the pulse signal shown in FIG. 3.

The operation of the film feed position detecting device 20 that encompasses the present invention can be explained with reference to FIGS. 1 and 3. At position P1, the tracks 6A and 7A of the contact terminals 6 and 7 that serve as contact points both touch one of the OFF pattern sections 3G in the second semiconductor pattern 3. Consequently, the GND terminal and the Vcc power source terminal are in an OFF state, and an OFF pulse signal "0" is output.

At position P2, the contact terminal 6 touches the ON pattern section 2V in the first semiconductor pattern 2 while the other contact terminal 7 touches the second semiconductor pattern 3. Consequently, the GND terminal and the Vcc power source terminal are in an ON state, and an ON pulse signal "1" is output. At the positions P3 to P14, the ON and OFF states of positions P1 and P2 are alternately repeated, with an ON state occurring at position P14. Accordingly, ON signals are output at even numbered positions (P2, P4, . . . , P14) and OFF signals are output at odd numbered positions (P1, P3, . . . , P13). At position P15, both contact terminals 6 and 7 contact the OFF pattern section 2G formed in the first semiconductor pattern 2, and an OFF pulse signal "0" is output.

As explained above, in positions P1 to P14, the OFF state occurs if both contact terminals 6 and 7 contact the OFF pattern section 3G of the second semiconductor pattern 3 connected to the GND terminal. At position P15, however, both contact terminals 6 and 7 contact the OFF pattern section 2G of the first semiconductor pattern 2 connected to the Vcc power source terminal and do not contact the second semiconductor pattern 3. Similar to the other OFF states, however, the GND terminal and the Vcc power source terminal are in an OFF state, so an OFF pulse signal "0" is output.

At position P16, similar to the other ON states, the contact terminal 6 contacts the ON pattern section 2V of the first semiconductor pattern 2 while the contact terminal 7 contacts the second semiconductor pattern 3. Consequently, the GND terminal and the Vcc power source terminal are in an ON state, and an ON pulse signal "1" is output.

Figure 1:
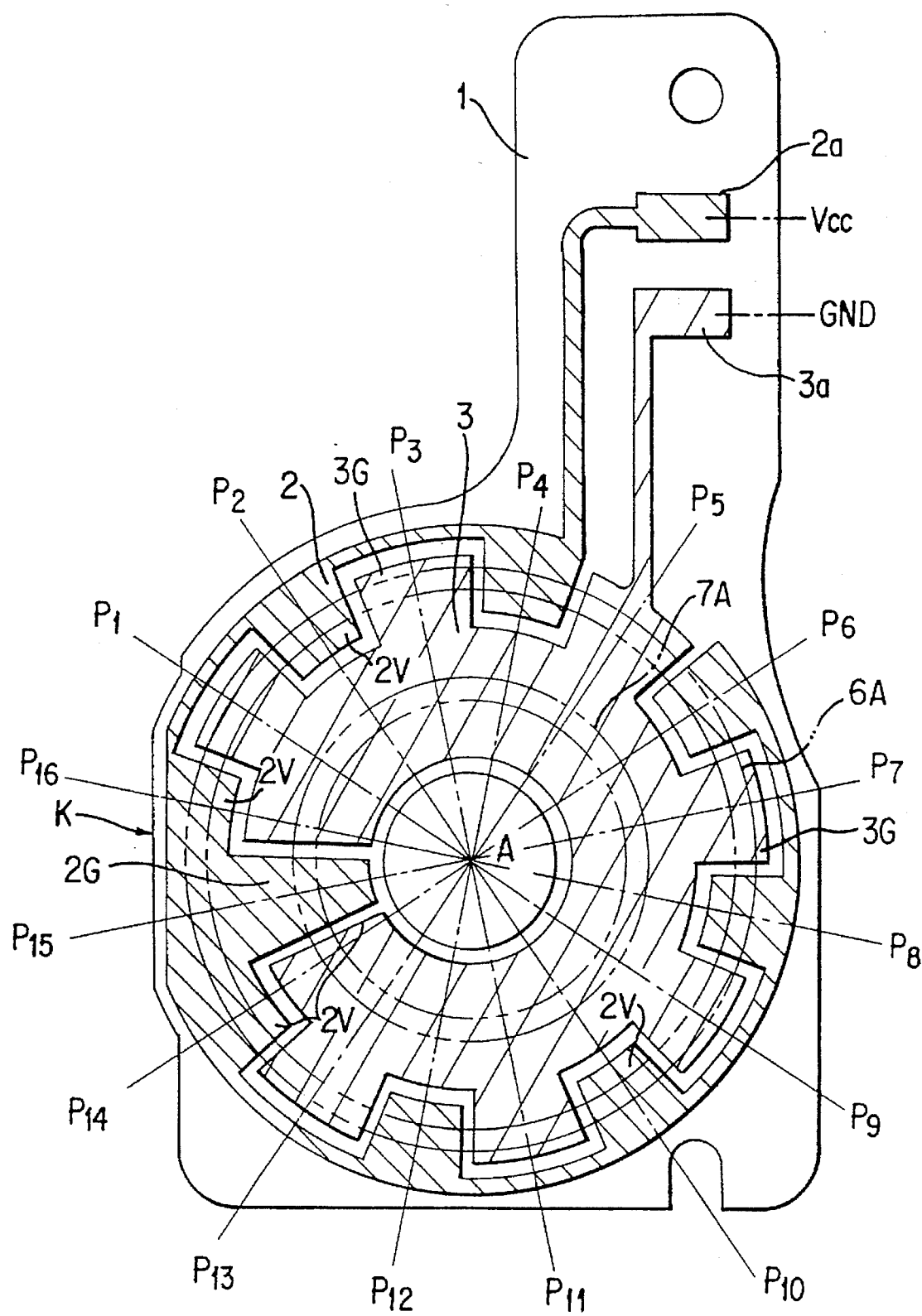
FIG. 1 is a plan view that shows the detailed shape of semiconductor patterns arranged on a rigid substrate.
Figure 2:
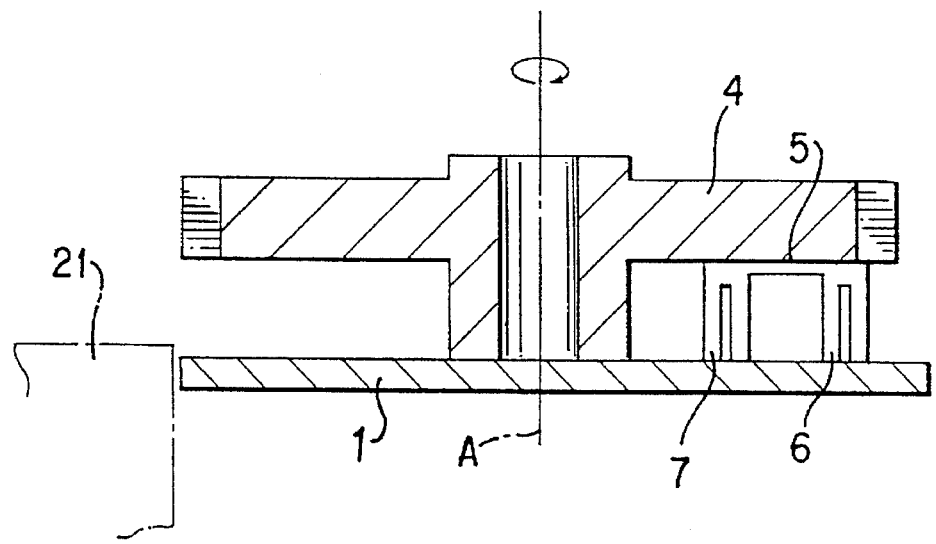
FIG. 2 is a cross-sectional view that shows a position detecting gear having a contact that rubs along the semiconductor patterns on the rigid substrate as shown in FIG. 1.

FIG. 3 shows the output signals of the contact terminals 6 and 7 in each of the positions P1 to P16 shown in FIG. 1. In FIG. 3, the ON and OFF pulse signals are output with the same spacing and, at position P15, the correct OFF pulse signal "0" is output by the terminals contacting the OFF pattern section 2G.

The shape of the semiconductor patterns 2 and 3 at position P15 is special in comparison to their shape at other positions. Consequently, a portion of the edge of the substrate 1 can be eliminated, as delineated by the line K in FIG. 6. As a result, the substrate 1 is more compact, and the area that interferes with the shutter 22 is eliminated.

Although the present invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as described herein.

For example, although the present invention as described above includes first and second semiconductor patterns that are formed on the substrate 1 in concentric circles about an axis of rotation A, the present invention is not limited to semiconductor patterns of this shape. The ON and OFF pattern sections in the semiconductor patterns can be formed on the tracks of contact terminals that move in a straight line or along a curve to achieve the same results. Furthermore, the present invention can also be used as an AF lens or zoom lens driving position detecting device in a camera or as an electrical connection device for phase difference detecting in other applications.

What is claimed is:

1. A phase detection electrical connection device comprising:
   a substrate having a first conductor pattern and a second conductor pattern formed on a surface of said substrate;
   a contact having two contact terminals, said contact terminals being disposed to touch said surface on which said first conductor pattern and said second conductor pattern are formed;
   said substrate and said contact being movable relative to each other, a first track being defined at locations where said substrate surface and a first one of said two contact terminals touch each other during relative movement of said substrate and said contact, a second track being defined at locations where said substrate surface and a second one of said two contact terminals touch each other during relative movement of said substrate and said contact;
   said first conductor pattern having at least one first OFF pattern section that intersects both said first track and said second track, said two contact terminals simultaneously touching said first OFF pattern section when said substrate and said contact are in a first predetermined position relative to each other; and
   said second conductor pattern having at least one second OFF pattern section that intersects both said first track and said second track, said two contact terminals simultaneously touching said second OFF pattern section when said substrate and said contact are in a second predetermined position relative to each other.

2. The device of claim 1, wherein said first conductor pattern and said second conductor pattern are disposed in concentric, annular shapes about an axis of rotation on said substrate and said contact is configured to revolve in a contact rotation direction about said axis of rotation.

3. The device of claim 2, wherein said second conductor pattern comprises a plurality of said second OFF pattern sections that are separated from each other by a predetermined spacing in the contact rotation direction such that said two contact terminals simultaneously touch each of said second OFF pattern sections in sequence during revolution of said contact in the contact rotation direction.

4. The device of claim 2, wherein said second conductor pattern is disposed within an inner periphery of said first conductor pattern.

5. The device of claim 2, wherein an outer periphery of said first conductor pattern is noncircular.

6. The device of claim 2, wherein an outer periphery of said first conductor pattern is circular except for a portion that contains a disruption, said first OFF pattern section being located at said disruption.

7. The device of claim 1 wherein said first OFF pattern section of said first conductor pattern is interposed between two second OFF pattern sections of said second conductor pattern.

8. The device of claim 1, wherein said first conductor pattern comprises a plurality of ON pattern sections where said first conductor pattern only intersects one of said first and second tracks, said first OFF pattern section being interposed between two of said ON pattern sections.

9. The device of claim 8, wherein said first OFF pattern section adjoins said two of said first ON pattern sections.

10. The device of claim 9, wherein said first OFF pattern section adjoined with said two ON pattern sections substantially forms a T-shape.

11. The device of claim 1, wherein said first conductor pattern is connected to a first voltage, said second conductor pattern in connected to a second voltage that is different from said first voltage, such that electricity does not flow between said two contact terminals when said two contact terminals simultaneously touch either said first OFF pattern section or said second OFF pattern section, electricity flowing through said contact when said two contact terminals engage different ones of said first and second conductor patterns.

12. The device of claim 11, wherein said second voltage is zero.

13. A substrate for a phase detection electrical connection device that includes a contact having first and second contact terminals, the contact and substrate being movable relative to each other such that a first track is defined at locations on said substrate where a first contact terminal touches said substrate and a second track is defined at locations on said substrate where the second contact terminal touches said substrate, said substrate comprising:
  a first conductor pattern having at least one first OFF pattern section that intersects both the first track and the second track;
  a second conductor pattern having at least one second OFF pattern section that intersects both the first track and the second track;
  said first conductor pattern and said second conductor pattern including plural ON pattern sections where said first conductor pattern intersects only the first track and where the second conductor pattern intersects only the second track, said ON pattern sections alternating with said first and second OFF pattern sections.

14. The substrate of claim 13, wherein said first conductor pattern and said second conductor pattern are disposed in concentric, annular shapes about an axis of rotation on said substrate surface.

15. The substrate of claim 14, wherein said second conductor pattern includes a plurality of said second OFF pattern sections that are separated from each other by a predetermined spacing in a direction of rotation about said axis of rotation.

16. The substrate of claim 15, wherein said second conductor pattern comprises a plurality of said second OFF pattern sections, and wherein said first OFF pattern section of said first conductor pattern is interposed between two of said second OFF pattern sections of said second conductor pattern.

17. The substrate of claim 16, wherein said second conductor pattern is disposed within an inner periphery of said first conductor pattern.

18. The substrate of claim 17, wherein an outer periphery of said first conductor pattern is noncircular.

19. The substrate of claim 13, wherein said first conductor pattern includes a disruption, said first OFF pattern section being located at said disruption.

20. The substrate of claim 13, wherein said first conductor pattern is connected to a first voltage, said second conductor pattern is connected to a second voltage that is different from said first voltage, such that electricity flows between said two contact terminals when intersecting said ON pattern sections, and electricity does not flow between said two contact terminals when said two contact terminals simultaneously touch either said first OFF pattern section or said second OFF pattern section.

21. A phase detection electrical connection device comprising:
  a substrate having a first conductor pattern and a second conductor pattern that are concentrically disposed on a surface of said substrate about an axis of rotation of said substrate;
  a contact having two contact terminals, said contact terminals being disposed to touch said surface on which said first conductor pattern and said second conductor pattern are formed;
  said substrate and said contact being rotatable relative to each other, a first track being defined at locations where said substrate surface and a first one of said two contact terminals touch each other during relative rotation of said substrate and said contact, a second track being defined at locations where said substrate surface and a second one of said two contact terminals touch each other during relative rotation of said substrate and said contact;
  said first conductor pattern including a plurality of ON pattern sections that intersect only said first track at regularly spaced intervals, and a first OFF pattern section that intersects both said first track and said second track;
  said second conductor pattern including a plurality of ON pattern sections corresponding in number to said plurality of ON pattern sections of said first conductor pattern, said plurality of ON pattern sections of said second conductor pattern being aligned with said plurality of ON pattern sections of said first conductor pattern such that said plurality of ON pattern sections of said second conductor pattern intersect only said second track at said regularly spaced intervals;
  said second conductor pattern including a plurality of second OFF pattern sections that intersect both said first track and said second track, said first OFF pattern section being interposed between two of said plurality of ON pattern sections, said plurality of second OFF pattern sections being interposed between said plurality of ON pattern sections except between said two ON pattern sections where said first OFF pattern section is interposed.

22. The device of claim 21, wherein said second conductor pattern is disposed within an inner periphery of said first conductor pattern.

23. The device of claim 21, wherein said first OFF pattern section adjoins said two of said first ON pattern sections.

24. The device of claim 21, wherein an outer periphery of said first conductor pattern includes a disruption, said first OFF pattern section being located at said disruption.

25. The device of claim 21, wherein said _first conductor pattern is connected to a first voltage, said second conductor pattern is connected to a second voltage that is different from said first voltage, such that electricity flows between said two contact terminals when intersecting said ON pattern sections, and electricity does not flow between said two contact terminals when said two contact terminals simultaneously touch either said first OFF pattern section or said second OFF pattern section.

26. A film feed position detecting device comprising:

a camera body;

a shutter assembly attached to a front side of said camera body; and a phase detection device located in said camera body adjacent to a film winding portion of said camera, said phase detection device comprising:

a substrate having a first conductor pattern and a second conductor pattern formed on a surface of said substrate;

a contact having two contact terminals, said contact terminals being disposed to touch said surface on which said first conductor pattern and said second conductor pattern are formed;

said substrate and said contact being movable relative to each other, a first track being defined at locations where said substrate surface and a first one of said two contact terminals touch each other during relative movement of said substrate and said contact, a second track being defined at locations where said substrate surface and a second one of said two contact terminals touch each other during relative movement of said substrate and said contact;

said first conductor pattern having at least one first OFF pattern section that intersects both said first track and said second track, said two contact terminals simultaneously touching said first OFF pattern section when said substrate and said contact are in a first predetermined position relative to each other; and said second conductor pattern having at least one second OFF pattern section that intersects both said first track and said second track, said two contact terminals simultaneously touching said second OFF pattern section when said substrate and said contact are in a second predetermined position relative to each other.

* * * * *